US011866308B2

(12) United States Patent
Larmonier et al.

(10) Patent No.: US 11,866,308 B2
(45) Date of Patent: Jan. 9, 2024

(54) SELF-ERECTING CRANE WITH CONTROL OF THE CONFIGURATION CHANGE OPERATIONS

(71) Applicant: MANITOWOC CRANE GROUP FRANCE, Dardilly (FR)

(72) Inventors: Nicolas Larmonier, Lyons (FR); François Lemire, Soucieu en Jarrest (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 24 days.

(21) Appl. No.: 17/834,292

(22) Filed: Jun. 7, 2022

(65) Prior Publication Data

US 2022/0388817 A1 Dec. 8, 2022

(30) Foreign Application Priority Data

Jun. 7, 2021 (FR) ...................................... 21/05978

(51) Int. Cl.
*B66C 23/68* (2006.01)
*B66C 23/34* (2006.01)

(52) U.S. Cl.
CPC ............ *B66C 23/68* (2013.01); *B66C 23/342* (2013.01); *B66C 2700/03* (2013.01)

(58) Field of Classification Search
CPC ..... B66C 23/34; B66C 23/342; B66C 23/344; B66C 23/348; B66C 23/42; B66C 23/68; B66C 2700/03; B66C 13/18
See application file for complete search history.

(56) References Cited

U.S. PATENT DOCUMENTS 4,895,263 A * 1/1990 Saint Gerand ........ B66C 23/348 212/300
5,493,798 A * 2/1996 Rocke ..................... E02F 3/437 701/50

(Continued)

FOREIGN PATENT DOCUMENTS

EP 0 733 584 A1 9/1996
EP 3 466 865 A1 4/2019
WO 2016102050 A1 6/2016

OTHER PUBLICATIONS

Search Report issued in connection with FR Pat. Appl. 21/05978, dated Feb. 4, 2022.

*Primary Examiner* — Michael R Mansen
*Assistant Examiner* — Juan J Campos, Jr.
(74) *Attorney, Agent, or Firm* — Cook Alex Ltd.

(57) ABSTRACT

A self-erecting crane includes a mast supporting a foldable jib having jib elements articulated together, configurable between a transport configuration and a work configuration. The crane also includes a motor-driven folding/unfolding system for performing configuration change operations implementing kinematics of folding and unfolding the jib, and a control/command system connected to the motor-driven folding/unfolding system to drive it. One or several inclinometer(s) are mounted on one or several jib element(s) to measure actual inclinations of the jib element(s) with respect to a reference axis. The control/command system is configured to drive the motor-driven folding/unfolding system according to the actual inclinations of the jib element(s) during the kinematics of folding and unfolding the jib.

17 Claims, 5 Drawing Sheets

(56) References Cited

U.S. PATENT DOCUMENTS

| | | | | |
|---|---|---|---|---|
| 6,276,541 | B1 * | 8/2001 | Gevaudant .............. | B66C 23/26 212/300 |
| 6,371,214 | B1 * | 4/2002 | Anwar .................... | E02F 3/434 701/50 |
| 2002/0096484 | A1 * | 7/2002 | Bertinotti .............. | B66C 23/342 212/300 |
| 2003/0127409 | A1 * | 7/2003 | Verchere ................. | B66C 23/34 212/300 |
| 2022/0144600 | A1 * | 5/2022 | Cánovas Martínez ...................... | B66C 23/68 |

* cited by examiner

SELF-ERECTING CRANE WITH CONTROL OF THE CONFIGURATION CHANGE OPERATIONS

FIELD

The invention relates to a self-erecting crane, and more particularly to a self-erecting crane with a foldable jib.

BACKGROUND

A crane, known for example from document EP 0 733 584 A1, comprises a mast, generally a foldable mast or a telescopic mast, supporting a foldable jib comprising jib elements articulated together. Such a self-erecting crane is configurable between a transport configuration in which the mast and the jib are joined or folded together or side-by-side, and at least one work configuration in which the mast and the jib are deployed.

In the work configuration, the mast is substantially vertical (that is to say, extending in a direction parallel to the Earth's gravity force) and the jib is substantially horizontal. It could be considered to have a work configuration in which the mast is substantially vertical and the jib is inclined with respect to the horizontal, in other words the jib is raised with respect to the horizontal, such a work configuration being called a raised configuration; the inclination of the jib allowing setting the load closer or further away and thus avoiding at the same time mounting the crane too high. In the work configuration(s), with the jib horizontal or the jib raised, the crane is then suited to for lift and move loads.

In the transport configuration, the mast and the jib are folded against each other, horizontally, so as to occupy a reduced volume and be more easily transportable on the road.

Such a self-erecting crane comprises a motor-driven folding/unfolding system which is coupled to the mast and to the jib to act on the mast and on the jib in order to perform configuration change operations implementing kinematics of folding and unfolding the jib. The unfolding, also called deployment, corresponds to a mounting of the crane, that is to say the switch from the transport configuration into the work configuration. The folding corresponds to a dismantling of the crane, that is to say the switch from the work configuration into the transport configuration.

Conventionally, either a driver acts on the motor-driven folding/unfolding system to fold or unfold the crane, or a control/command system drives the motor-driven folding/unfolding system in automated folding or unfolding sequences, without any control being operated, with the exception of a visual control by the driver who ensures that the movements of the mast elements and of the jib elements are consistent. However, incorrect movement of any of these elements, for example due to a mechanical blockage which locks the movement, can lead to damage to the crane, or even to its complete immobilization while repairing or replacing it.

SUMMARY

Also, the invention suggests implementing an automated control of the configuration change operations, for example in order to stop the operation in progress and/or to alert the driver.

Thus, the invention proposes a self-erecting crane comprising a mast supporting a jib, said jib being a foldable jib comprising jib elements articulated together, said self-erecting crane being configurable between a transport configuration in which the mast and the jib are joined together or side-by-side, and at least one work configuration in which the mast and the jib are deployed, said self-erecting crane comprising a motor-driven folding/unfolding system which is coupled to the mast and to the jib to act on said mast and on said jib in order to perform configuration change operations implementing kinematics of folding and unfolding the jib, and comprising a control/command system connected to the motor-driven folding/unfolding system to drive it and control the configuration change operations.

The self-erecting crane includes one or several inclinometer(s) mounted on one or several jib element(s) for measuring actual inclinations of said jib element or said several jib elements with respect to a reference axis.

The control/command system is configured to drive the motor-driven folding/unfolding system and to control the configuration change operations according to the actual inclinations of said jib element or of said several jib elements during kinematics of folding and unfolding the jib.

Thus, the inclinometer(s) allow(s) monitoring in real time the inclination of a jib element, or the inclinations of several jib elements, which allows controlling in real time the consistency of the movements of this jib element or of these jib elements during the kinematics of folding and unfolding the jib. In this way, the control/command system, connected to the inclinometer(s), can control the inclination of this jib element or the inclinations of these jib elements in different configurations (in particular intermediate or transient configurations) and thus validate these configurations (based on a modeling of the kinematics of folding and unfolding the jib) and also control and validate the movement of this jib element or the movements of these jib elements between two configurations (for example between the transport configuration and an intermediate configuration, or between two intermediate configurations, or between an intermediate configuration and the work configuration).

It should be noted that the motor-driven folding/unfolding system can comprise one or several actuator(s), and for example at least one cylinder-type actuator which is coupled to the mast to raise and lower it and at least one winch-type actuator (also called retaining winch) which comprises a drum on which a cable coupled to the jib to fold/unfold the jib is wound.

It should also be noted that the inclinometer(s) allow monitoring in real time the inclination of a jib element, or the inclinations of several jib elements, which also allows knowing the inclination of the mast in certain configurations in which the jib is folded against the mast. Indeed, at the start of the unfolding, whether in the transport configuration and in one or several intermediate configuration(s) which follow the transport configuration, the jib is folded against the mast, so that one or several inclinometer(s) can be used to monitor the inclination of the mast. Thus, the inclinometer(s) allow(s) controlling the inclination of other parts of the crane, such as the mast, in certain configurations.

According to one feature, the crane comprises at least two inclinometers mounted on two respective jib elements to measure the actual inclinations of said two jib elements with respect to the reference axis.

The use of at least two inclinometers allows monitoring at least two jib elements, thereby refining the monitoring of the kinematics of folding and unfolding the jib.

According to one variant, the crane comprises three inclinometers mounted on three respective jib elements to measure the actual inclinations of these three jib elements with respect to the reference axis.

According to one possibility, the jib elements comprise at least one first jib element, forming a jib foot, which is articulated on the mast, and a second jib element articulated on the first jib element, and wherein a first inclinometer is mounted on one of the first jib element and of the second jib element.

It is indeed advantageous to monitor the inclination of at least one of this first jib element and of the second jib element, because their positions mean that their movements are essential for understanding the kinematics of folding and unfolding the jib.

According to another possibility, a second inclinometer is mounted on the other one of the first jib element and of the second jib element.

In a particular embodiment, the jib occupies successive intermediate configurations between the transport configuration and the work configuration, and vice versa, during the kinematics of folding and unfolding the jib, and the control/command system is configured to control the configuration change operations as a function of the actual inclinations of the jib element or of several jib elements in several intermediate configurations, for example in all intermediate configurations, or between successive intermediate configurations.

The folding and unfolding of the jib generally takes place in the form of decompositions of transient movements, with successive transient movements which define intermediate configurations between each transient movement. Controlling all or part of these intermediate configurations allows efficient monitoring of the kinematics of folding and unfolding the jib. It should therefore be noted that an intermediate configuration is a static configuration (and not a dynamic configuration) which is the result of a previous transient movement (or a previous displacement) of at least one mast element or jib element, and which precedes a posterior transient movement (or a posterior displacement) of at least one other mast element or jib element.

Advantageously, the crane comprises a memory storing theoretical inclinations of the jib element or of the several jib elements with respect to the reference axis, and the control/command system is connected to said memory and is configured to control the configuration change operations by comparing the theoretical inclinations with the actual inclinations during the kinematics of folding and unfolding the jib.

These theoretical inclinations thus define a modeling of the kinematics of folding and unfolding the jib, which will allow effectively checking the consistency of the transient movements and the positions of the jib elements in the intermediate configurations, and thus validate these intermediate configurations as well as the consistency of the transient movements during the displacements between two intermediate configurations.

In a particular embodiment, the memory stores theoretical inclinations of the jib element or of the several jib elements in several intermediate configurations, for example in all intermediate configurations, and the control/command system is configured to control the configuration change operations by comparing the theoretical inclinations with the actual inclinations in the several intermediate configurations during the kinematics of folding and unfolding the jib.

According to one possibility, the memory stores theoretical inclinations of the jib element or of the several jib elements in the transport configuration and in the work configuration, and the control/command system is configured to control the configuration change operations also comparing the theoretical inclinations with the actual inclinations in the transport configuration and in the work configuration during the kinematics of folding and unfolding the jib.

Advantageously, the control/command system is configured to authorize the switch from a current configuration into a posterior configuration, such as for example from a current intermediate configuration to a posterior intermediate configuration, on condition that the actual inclination of the jib element or the actual inclinations of the several jib elements in the current configuration correspond to the theoretical inclination of the jib element or the theoretical inclinations of the several jib elements in the current configuration.

In other words, during the configuration change operations, which move elements from one configuration to another configuration until reaching the transport configuration or the work configuration, the control/command system allows switching from one configuration (current configuration) into another configuration (posterior configuration) only on the condition that the actual inclination(s) correspond(s) to the corresponding inclination(s) in the current configuration. As long as the condition is not met, it is not possible to continue the configuration change beyond the current configuration.

In the context of the invention, a current configuration can be the transport configuration, the work configuration or any of the intermediate configurations. Similarly, a posterior configuration can be the transport configuration, the work configuration, or any of the intermediate configurations.

In an advantageous embodiment, the control/command system is configured to detect a folding/unfolding non-compliance if an actual inclination of the jib element or of one of the several jib elements, called non-compliant jib element, does not correspond to the theoretical inclination of said non-compliant jib element during the kinematics of folding and unfolding the jib.

According to one feature, the control/command system is configured to detect folding/unfolding non-compliance if the actual inclination of the non-compliant jib element does not correspond to the theoretical inclination of said non-compliant jib element in at least one of the intermediate configurations.

According to another feature, the control/command system is configured to stop the motor-driven folding/unfolding system in response to a detection of a folding/unfolding non-compliance.

According to one variant, the crane comprises an alarm system capable of emitting an alarm signal and connected to the control/command system, said control/command system being configured to command the emission of the alarm signal by the alarm system in response to a detection of a folding/unfolding non-compliance.

The invention also relates to a control method for controlling configuration change operations of a self-erecting crane comprising a mast supporting a jib, said jib being a foldable jib comprising jib elements articulated together, the configuration change operations implementing kinematics of folding and unfolding the jib and causing said self-erecting crane to switch from a transport configuration in which the mast and the jib are joined together or side-by-side, into a work configuration in which the mast and the jib are deployed, or vice versa.

The control method implements the following steps:

- measuring actual inclinations of one or several jib element(s) with respect to a reference axis, by means of one or several inclinometer(s) mounted on said jib element or on said several jib elements; and controlling the configuration change operations according to the actual inclinations of said jib element or of said several jib elements during the kinematics of folding and unfolding the jib.

In a particular embodiment, theoretical inclinations of the jib element or of the several jib elements with respect to the reference axis are stored in a memory, and the control of the configuration change operations comprises a comparison of the theoretical inclinations with the actual inclinations during the kinematics of folding and unfolding the jib.

According to one possibility, a folding/unfolding non-compliance is detected if an actual inclination of the jib element or of one of the several jib elements, called non-compliant jib element, does not correspond to the theoretical inclination of said non-compliant jib element during the kinematics of folding and unfolding the jib.

According to another possibility, the jib occupies successive intermediate configurations between the transport configuration and the work configuration, and vice versa, during the kinematics of folding and unfolding the jib, and the folding/unfolding non-compliance is detected if the actual inclination of the non-compliant jib element does not correspond to the theoretical inclination of said non-compliant jib element in at least one of the intermediate configurations.

According to one feature, the configuration change operation is stopped in response to a detection of a folding/unfolding non-compliance.

According to another feature, an alarm signal is emitted in response to a detection of a folding/unfolding non-compliance.

BRIEF DESCRIPTION OF THE DRAWINGS

Other features and advantages of the present invention will appear on reading the detailed description hereinafter, of a non-limiting example of implementation, made with reference to the appended figures in which.

DESCRIPTION

Figure 6:
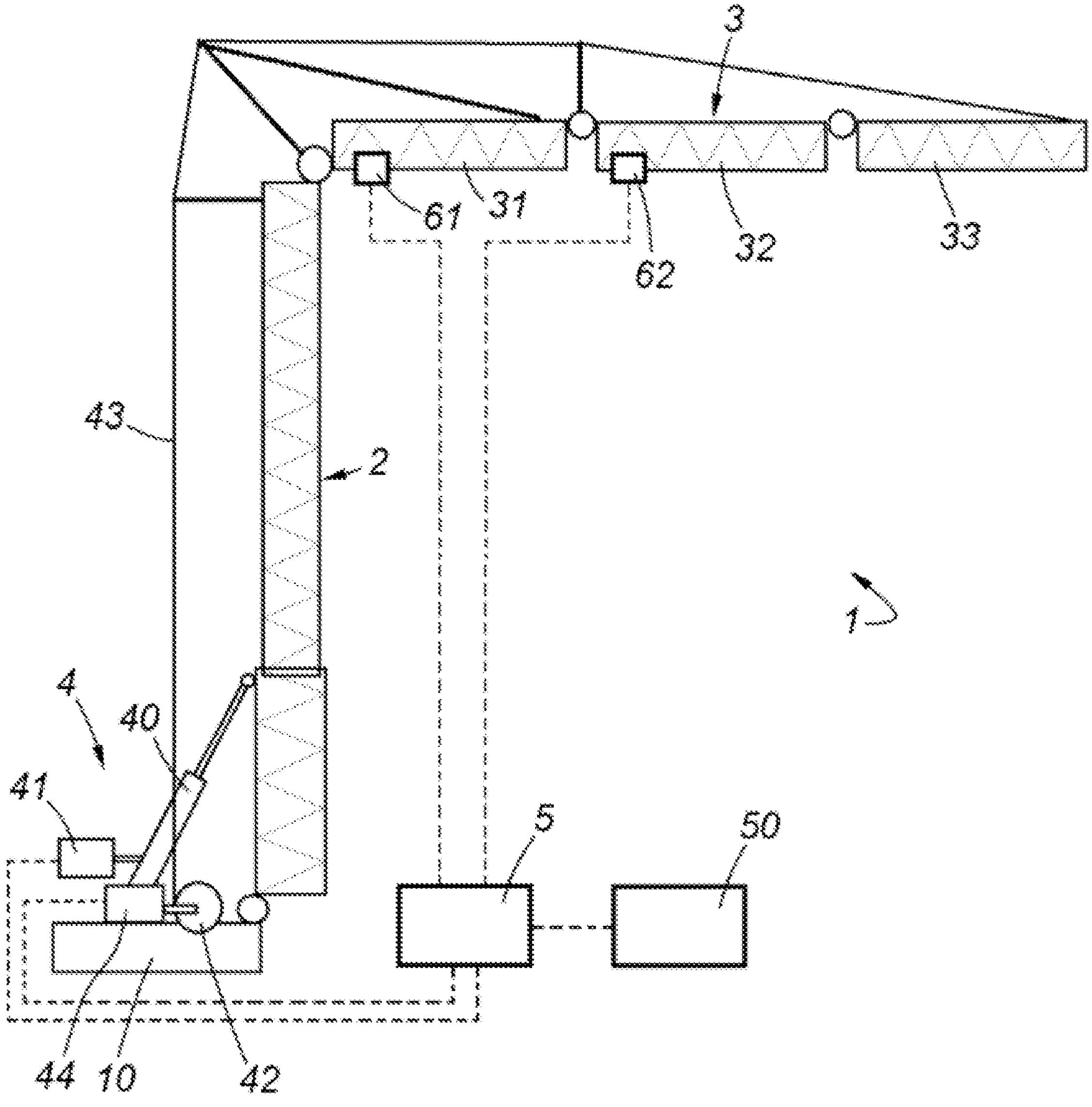
FIG. 6 is a schematic view of a self-erecting crane according to the invention, illustrating the control/command system connected to inclinometers and to actuators of the motor-driven folding/unfolding system.

Referring to FIG. 6, a self-erecting crane 1 according to the invention comprises a mast 2 mounted on a platform 10 and supporting a jib 3. The mast 2 may be a foldable mast comprising mast elements articulated together, or be a telescopic mast comprising mast elements 21, 22 telescopically mounted as in the examples illustrated in the Figures. In turn, the jib 3 is a foldable jib comprising jib elements 31, 32, 33 articulated together. In the illustrated examples, the jib 3 comprises three successive jib elements 31, 32, 33, namely:

- a first jib element 31, forming a jib foot, which is articulated on the mast 2,
- a second jib element 32, forming a central element, articulated on the first jib element 31, and
- a third jib element 33, forming a jib tip, articulated on the second jib element 32.

The crane 1 is configurable between:

- a transport configuration CT (shown in FIGS. 2 and 3) in which the mast 2 and the jib 3 are joined together or side-by-side and extend horizontally, in order to form a transportable package, and more specifically in which the mast elements 21, 22 are folded on themselves (in the foldable mast version) or are retracted on themselves (in the telescopic mast version) and the jib elements 31, 32, 33 are folded both on themselves and on the mast elements 21, 22;
- at least one work configuration CW (shown in FIGS. 2 to 4) in which the mast 2 and the jib 3 are deployed, and more specifically in which the mast elements 21, 22 are unfolded (in the foldable mast version) or are deployed (in the telescopic mast version) and the jib elements 31, 32, 33 are unfolded to extend substantially horizontally, in other words along a horizontal axis (horizontal jib 3) or to extend along an axis inclined with respect to the horizontal (jib 3 raised).

In the rest of the description, only the work configuration with the horizontal jib 3 is described.

Figure 1:
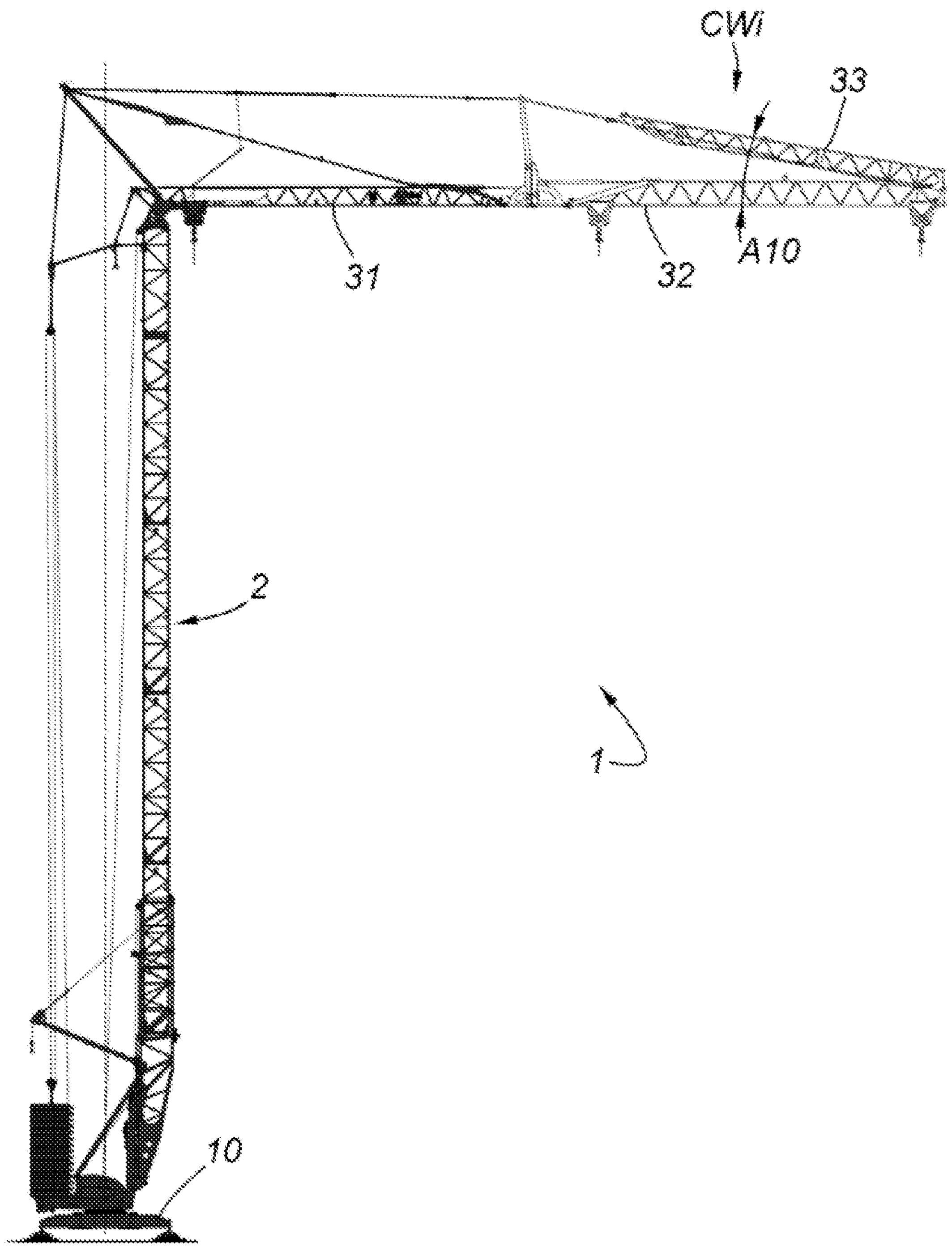
FIG. 1 is a schematic view of a self-erecting crane suitable for the invention.

It should be noted that, in the context of a jib 3 with three jib elements 31, 32, 33, it is possible to have an intermediate work configuration CWI (shown in FIGS. 1 to 3) in which only the first jib element 31 and the second jib element 32 are unfolded horizontally, and the third jib element 33 remains folded back, above the second jib element 32. Such an intermediate work configuration CWI is used to work with a shorter jib 3, depending on needs and local work conditions.

The crane 1 is thus equipped with a motor-driven folding/unfolding system 4 which is coupled to the mast 2 and to the jib 3 to act on the mast 2 and on the jib 3 to fold and unfold the crane 1 and thus make it switch from the work configuration into the transport configuration, and vice versa. In other words, this motor-driven folding/unfolding system 4 allows performing configuration change operations implementing kinematics of folding and unfolding the jib 3, and where necessary of deploying and retracting the mast 2.

This motor-driven folding/unfolding system may comprise, in the example illustrated in FIG. 6, a tilt cylinder 40 connected between the platform 10 and the mast 2 to raise/lower the mast 2 between a vertically raised position and a horizontal lowered position, and vice versa. This tilt cylinder 40 may be of the hydraulic cylinder type powered by an electric motor 41. This motor-driven folding/unfolding system may comprise a folding/unfolding winch 42 mounted on the platform 10 and provided with a drum on which a folding/unfolding cable 43 connected to the jib 3, to fold/unfold the crane 1 and in particular its jib 3, is wound. This folding/unfolding winch 42 is activated by an electric motor 44.

The crane 1 further comprises a control/command system 5 connected to the motor-driven folding/unfolding system 4, and more specifically to the electric motors 41, 44, to drive it and control the configuration change operations. Thus, an operator can command the configuration change operations by means of a driving interface (not illustrated), such as for example a wired or wireless manual command, which is connected to the control/command system 5.

According to the invention, the crane 1 comprises at least one inclinometer mounted on one of the jib elements 32, 32, 33 to measure actual inclinations of this jib element with respect to a reference axis, such as a horizontal axis or a vertical axis. In the illustrated example, the crane 1 comprises two inclinometers, namely a first inclinometer 61 and a second inclinometer 62, mounted on the first jib element 31 and on the second jib element 32 respectively, to measure the actual inclinations of this first jib element 31 and of this second jib element 32 respectively.

Figure 4:
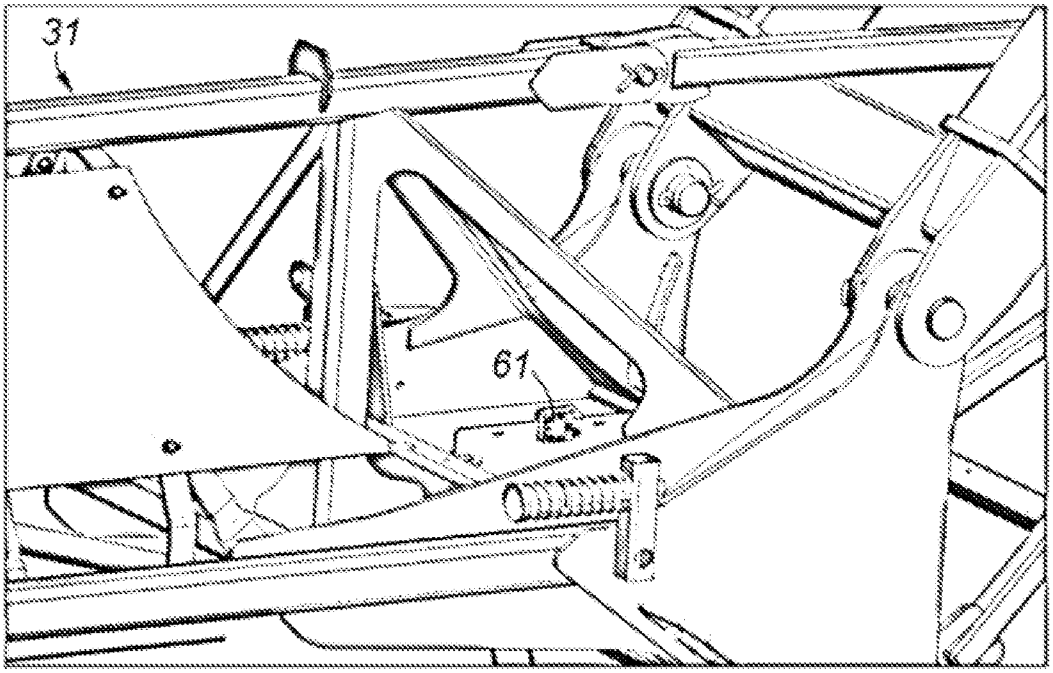
FIG. 4 is a partial schematic view of a first jib element, forming a jib foot, on which a first inclinometer is mounted.
Figure 5:
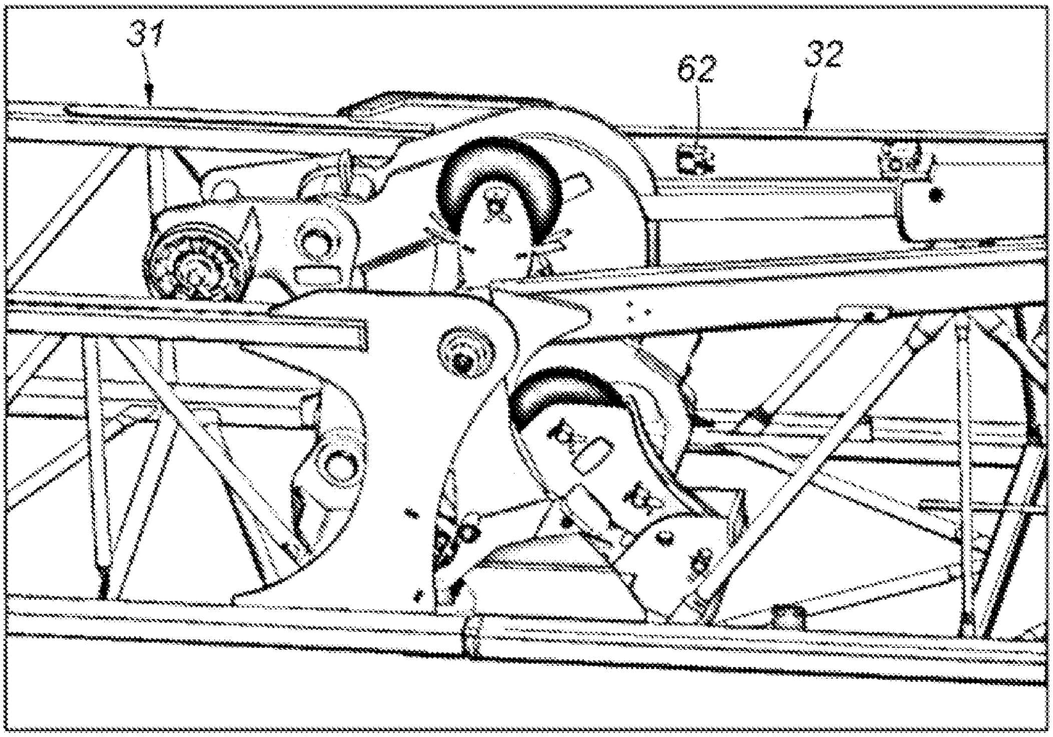
FIG. 5 is a partial schematic view of a second jib element on which a second inclinometer is mounted.

Referring to FIG. 4, the first inclinometer 61, fastened on the first jib element 31, can be placed near the articulation of the first jib element 31 on the top of the mast. Referring to FIG. 5, the second inclinometer 62, fastened on the second jib element 32, can be placed near the articulation between the second jib element 32 and the first jib element 31.

Each of the two inclinometers 61, 62 can be an inclinometer with absolute angular measurement with respect to the vertical or to the horizontal, depending on the model. The inclinometers 61, 62 may be sensors of reduced size which are directly mounted in a protected location of the structure of each jib element 31, 32.

The control/command system 5 is connected to the two inclinometers 61, 62 and can thus drive the motor-driven folding/unfolding system 4 and control the configuration change operations according to the actual inclinations of the first jib element 31 and of the second jib element 32 during the kinematics of folding and unfolding the jib 3.

Figure 2:
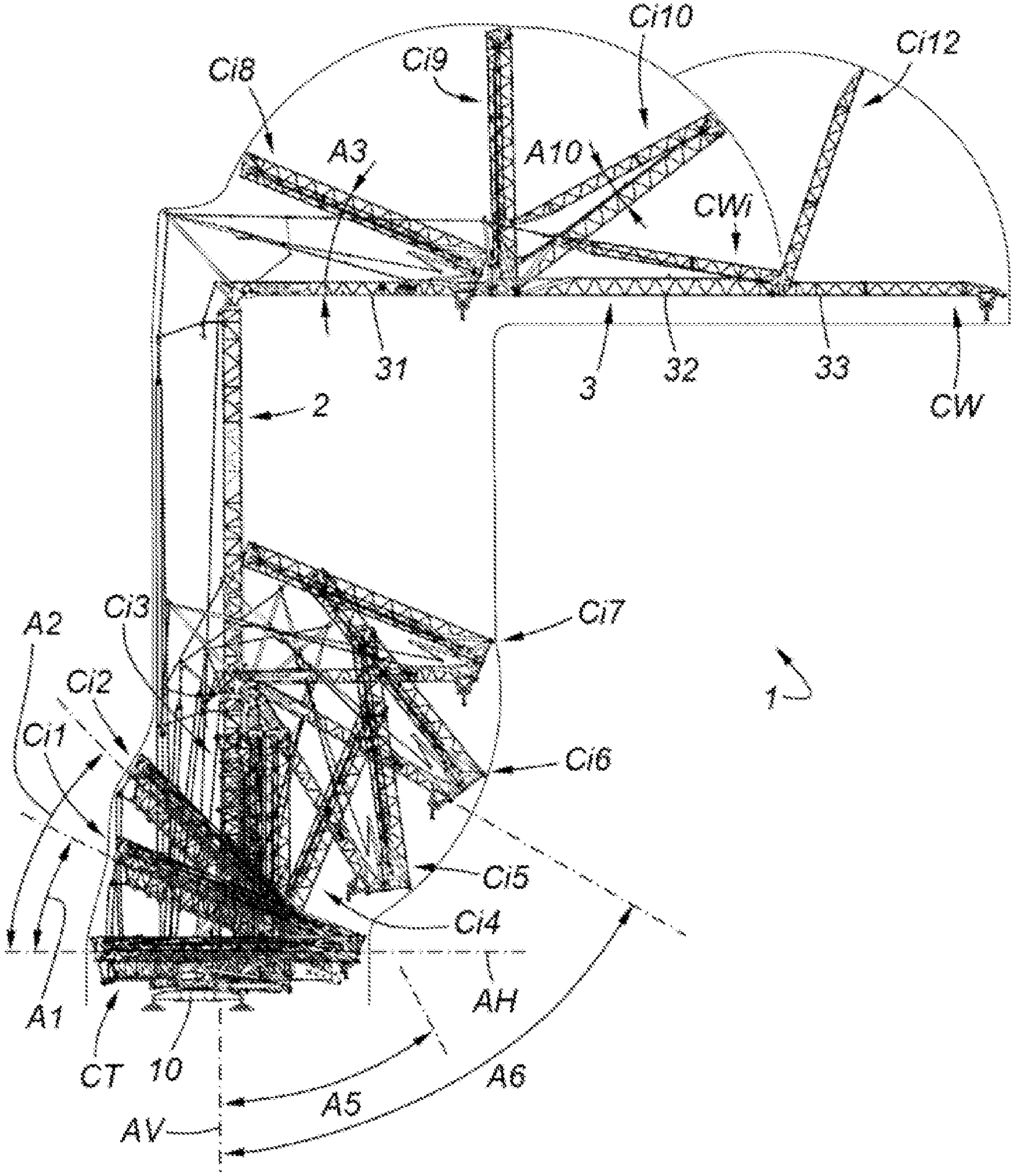
FIG. 2 is a schematic view of the self-erecting crane of FIG. 1 illustrating the different configurations of the crane from a transport configuration up to a work position according to a first kinematic model.
Figure 3:
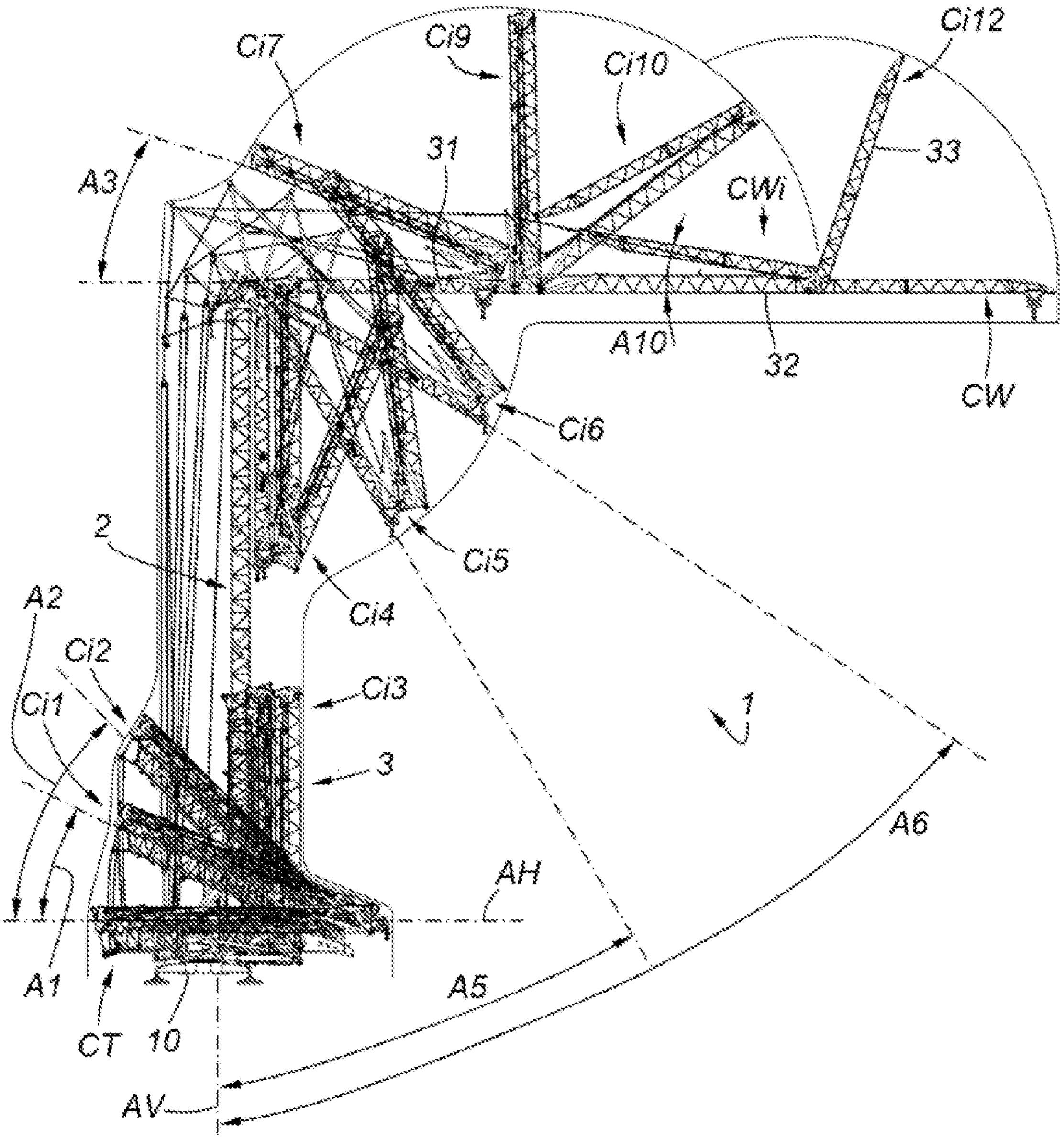
FIG. 3 is a schematic view of the self-erecting crane of FIG. 1 illustrating the different configurations of the crane from a transport configuration up to a work position according to a second kinematic model.

Referring to FIGS. 2 and 3, the crane 1, and therefore the mast 2 and the jib 3, occupy successive intermediate configurations between the transport configuration CT and the work configuration CW, and vice versa, during the kinematics of folding and unfolding the jib, starting (when starting from the transport configuration CT) with:

- a first intermediate configuration CI1 in which the mast 2 and the jib 3 are joined together or side-by-side and are inclined together with respect to the horizontal (or with respect to a horizontal axis AH) according to a first angle A1, for example in the range of 20 degrees; followed by
- a second intermediate configuration CI2 in which the mast 2 and the jib 3 are joined together or side-by-side and are inclined together with respect to the horizontal according to a second angle A2 larger than the first angle A1, for example in the range of 45 degrees; and followed by
- a third intermediate configuration CI3 in which the mast 2 and the jib 3 are joined together or side-by-side and are inclined together with respect to the horizontal at a right angle (or 90 degree angle), so that the mast 2 and the jib 3 are both vertical.

In these three intermediate configurations CI1, CI2, CI3, the mast 2 and all of the jib elements 31, 32, 33 have the same inclination, so that each of the two inclinometers 61, 62 allows monitoring in real time the inclinations of the mast 2 and of the jib elements 31, 32, 33.

Afterwards, once the third intermediate configuration CI3 has been reached (when starting from the transport configuration CT towards the work configuration CW), are planned:

- a first phase of unfolding the jib 3 comprising several successive intermediate configurations CI4 to CI7, and in which the jib 3 begins to unfold; and
- a phase of deploying the mast 2 in which the mast 2 is deployed to set the jib 3 in the high position.

In the kinematics of FIG. 2, the first phase of unfolding the jib 3 takes place before the phase of unfolding the mast 2 and conversely, in the kinematics of FIG. 3, the first phase of unfolding the jib 3 takes place after the phase of deploying the mast 2.

As regards the first phase of unfolding the jib 3, its successive intermediate configurations are:

- a fourth intermediate configuration CI4 in which the first jib element 31 remains vertical against the mast 2, whereas the second jib element 32 and the third jib element 33 are joined together and are inclined with respect to the first jib element according to a first given opening angle A3;
- a fifth intermediate configuration CI5 in which the first jib element 31 is moved away from the mast 2 to be inclined with respect to the vertical (or with respect to a vertical axis AV) according to a fifth angle A5, for example in the range of 30 degrees, whereas the second jib element 32 and the third jib element 33 are still joined together and are inclined with respect to the first jib element 31 according to the same first opening angle A3;
- a sixth intermediate configuration CI6 in which the first jib element 31 is further moved away from the mast 2 to be inclined with respect to the vertical at a sixth angle A6 larger than the fifth angle A5, for example in the range of 65 degrees, whereas the second jib element 32 and the third jib element 33 are still joined together and are inclined with respect to the first jib element 31 according to the same first opening angle A3;
- a seventh intermediate configuration CI7 in which the first jib element 31 is inclined with respect to the vertical at a right angle, so that the first jib element 31 is horizontal, whereas the second jib element 32 and the third jib element 33 are joined together and are inclined with respect to the first jib element 31 according to the same first opening angle A3.

In the kinematics of FIG. 2, the seventh intermediate configuration CI7 is followed by the phase of deploying the mast 2, so that it is followed by an eighth intermediate configuration CI8 in which the first jib element 31 is at the horizontal, whereas the second jib element 32 and the third jib element 33 are joined together and are inclined with respect to the first jib element 31 according to the same first opening angle A3.

In the kinematics of FIG. 3, the fourth intermediate configuration CI4 is preceded by the phase of deploying the mast 2, so that the seventh intermediate configuration CI7 in FIG. 3 corresponds to the eighth intermediate configuration CI8 in FIG. 2.

The two inclinometers 61, 62 allow monitoring in real time the inclinations of the three jib elements 31, 32, 33, insofar as the second jib element 32 and the third jib element 33 have the same relative inclination with respect to the first jib element 31 (according to the first opening angle A3).

Afterwards, once the seventh intermediate configuration CI7 or the eighth intermediate configuration CI8 has been reached (when starting from the transport configuration CT in the direction of the work configuration CW), a second phase of unfolding the jib 3 is planned, in which the second jib element 32 is unfolded.

As regards the second phase of unfolding the jib 3, its successive intermediate configurations are:

- a ninth intermediate configuration CI9 in which the first jib element 31 remains horizontal, whereas the second jib element 32 and the third jib element 33 move away together from the first jib element 31 and are inclined with respect to the horizontal at a right angle so as to be vertical;

a tenth intermediate configuration CI10 in which the first jib element 31 remains horizontal, whereas the second jib element 32 continues to move away from the first jib element 31 beyond the vertical position of the ninth configuration intermediate CI9, and finally the third jib element 33 moves away from the second jib element 32 according to a second opening angle A10, for example in the range of 5 to 10 degrees; and an eleventh intermediate configuration which corresponds to the previously-described intermediate work configuration CWI, in which the first jib element 31 is horizontal, the second jib element 32 is completely unfolded and also extends horizontally, and the third jib element 33 is moved away from the second jib element 32 according to the second opening angle A10.

This second opening angle A10 can be a mechanically fixed angle, to enable the unfolding of the third jib element 33 to be initiated.

The two inclinometers 61, 62 allow monitoring in real time the inclinations at least of the first jib element 31 and of the second jib element 32, or even also of the third jib element 33 considering that the second opening angle A10 is fixed or imposed mechanically in the intermediate configurations CI10 and CWI, so that its inclination is deduced from that of the second jib element 32. It is also possible to provide a third inclinometer on the third jib element 33 to monitor its inclination in real time.

Finally, once the intermediate work configuration CWI has been reached (when starting from the transport configuration CT in the direction of the work configuration CW), a third phase of unfolding the jib 3 is provided, in which the third jib element 33 is unfolded. As regards the third phase of unfolding the jib 3, a twelfth intermediate configuration CI12 is provided in which the first jib element 31 and the second jib element 32 are horizontal, and the third jib element 33 is moved away from the second jib element 32 at an inclination angle larger than or equal to 90 degrees, before reaching the work configuration CW in which the three jib elements 31, 32, 33 are all horizontal.

The control/command system 5 can thus be configured to control the configuration change operations according to the actual inclinations of the jib elements 31, 32 in all or part of the intermediate configurations or between successive intermediate configurations.

As shown in FIG. 6, the crane 1 may comprise a memory 50 storing theoretical inclinations of the jib elements 31, 32 with respect to the reference axis, in all or part of the intermediate configurations, for example in all intermediate configurations, and possibly also in the transport configuration CT and in the work configuration CW.

The control/command system 5 is connected to this memory 50 and is configured to control the configuration change operations by comparing the theoretical inclinations with the actual inclinations during the kinematics of folding and unfolding the jib 3. Thus, the control/command system 5 can validate each intermediate configuration before continuing the kinematics of folding or unfolding, based on the actual inclinations measured by the inclinometers 61, 62.

In practice, the control/command system 5 is configured to authorize the switch from a current configuration into a posterior configuration, on the condition that the actual inclinations of the jib elements 31, 32 in the current configuration correspond to the respective theoretical inclinations of the jib elements 31, 32 in this current configuration.

Also, the control/command system 5 is configured to detect a folding/unfolding non-compliance if an actual inclination of one of the jib elements 31, 32, called non-compliant jib element, does not correspond to the theoretical inclination of this non-compliant jib element during the kinematics of folding and unfolding the jib 3. Thus, the control/command system 5 assesses that there is a folding/unfolding non-compliance if, in a current configuration, the actual inclinations of at least one of the jib elements 31, 32 does not correspond to the theoretical inclination of this jib element in this current configuration. In this case, and as previously described, the control/command system 5 does not authorize switch into the posterior configuration, and it stops the motor-driven folding/unfolding system 4 in response to the detection of such folding/unfolding non-compliance.

Thus, the control/command system 5 checks the consistency of the movements and of the position of the jib elements 31, 32 during the transient mounting phases (in other words in the intermediate configurations) and thus validates the intermediate configurations during these transient phases as well as the consistency of the movements during the displacements of the jib elements 31, 32 between two intermediate configurations.

The invention claimed is:

1. A self-erecting crane comprising a mast supporting a jib, the jib being a foldable jib comprising jib elements articulated together, the self-erecting crane configurable between a transport configuration in which the mast and the jib are joined together or side-by-side, and at least one work configuration in which the mast and the jib are deployed, the self-erecting crane further comprising:

a motor-driven folding/unfolding system coupled to the mast and to the jib and configured to act on the mast and on the jib to perform configuration change operations implementing kinematics of folding and unfolding the jib;

a control/command system connected to the motor-driven folding/unfolding system, the control/command system configured to drive the motor-driven folding/unfolding system and control the configuration change operations; and one or several inclinometer(s) mounted on one or several of the jib element(s) for measuring actual inclinations of the jib element or of the several jib elements with respect to a reference axis, wherein the control/command system is configured to drive the motor-driven folding/unfolding system and control the configuration change operations according to the actual inclinations of the jib element or of the several jib elements during the kinematics of folding and unfolding the jib.

2. The self-erecting crane according to claim 1, wherein the several inclinometers include at least two inclinometers mounted on two respective jib elements for measuring the actual inclinations of the two jib elements with respect to the reference axis.

3. The self-erecting crane according to claim 2, wherein the jib elements comprise at least one first jib element, forming a jib foot, which is articulated on the mast, and a second jib element articulated on the first jib element, wherein a first inclinometer is mounted on one of the first jib element and the second jib element, and wherein a second inclinometer is mounted on the other one of the first jib element and the second jib element.

4. The self-erecting crane according to claim 1, wherein the jib elements comprise at least one first jib element, forming a jib foot, which is articulated on the mast, and a second jib element articulated on the first jib element, and wherein a first inclinometer is mounted on one of the first jib element and the second jib element.

5. The self-erecting crane according to claim 1, wherein the jib occupies successive intermediate configurations between the transport configuration and the work configuration, and vice versa, during the kinematics of folding and unfolding the jib, and wherein the control/command system is configured to control the configuration change operations according to the actual inclinations of the jib element or of the several jib elements in several intermediate configurations.

6. The self-erecting crane according to claim 5, further comprising a memory storing theoretical inclinations of the jib element or of the several jib elements with respect to the reference axis, wherein the control/command system is connected to the memory and is configured to control the configuration change operations by comparing the theoretical inclinations with the actual inclinations during the kinematics of folding and unfolding the jib, wherein the memory stores theoretical inclinations of the jib element or of the several jib elements in several intermediate configurations, and wherein the control/command system is configured to control the configuration change operations by comparing the theoretical inclinations with the actual inclinations in the several intermediate configurations during the kinematics of folding and unfolding the jib.

7. The self-erecting crane according to claim 6, wherein the memory stores theoretical inclinations of the jib element or of the several jib elements in the transport configuration and in the work configuration, and wherein the control/command system is configured to control the configuration change operations by also comparing the theoretical inclinations with the actual inclinations in the transport configuration and in the work configuration during the kinematics of folding and unfolding the jib.

8. The self-erecting crane according to claim 6, wherein the control/command system is configured to authorize switching from a current configuration into a posterior configuration, provided that the actual inclination of the jib element or the actual inclinations of the several jib elements in the current configuration correspond to the theoretical inclination of the jib element or to the theoretical inclinations of the several jib elements in the current configuration.

9. The self-erecting crane according to claim 6, wherein the control/command system is configured to detect a folding/unfolding non-compliance if an actual inclination of the jib element or one of several jib element(s), called non-compliant jib element, does not correspond to the theoretical inclination of the non-compliant jib element during the kinematics of folding and unfolding the jib, and wherein the control/command system is configured to detect the folding/unfolding non-compliance if the actual inclination of the non-compliant jib element does not correspond to the theoretical inclination of said non-compliant jib element in at least one of the intermediate configurations.

10. The self-erecting crane according to claim 5, wherein the control/command system is configured to detect a folding/unfolding non-compliance if an actual inclination of the jib element or one of several jib element(s), called non-compliant jib element, does not correspond to the theoretical inclination of the non-compliant jib element during the kinematics of folding and unfolding the jib.

11. The self-erecting crane according to claim 10, wherein the control/command system is configured to stop the motor-driven folding/unfolding system in response to a detection of a folding/unfolding non-compliance.

12. The self-erecting crane according to claim 1, further comprising a memory storing theoretical inclinations of the jib element or of the several jib elements with respect to the reference axis, wherein the control/command system is connected to the memory and is configured to control the configuration change operations by comparing the theoretical inclinations with the actual inclinations during the kinematics of folding and unfolding the jib.

13. A control method for controlling configuration change operations of a self-erecting crane comprising a mast supporting a jib, the jib being a foldable jib comprising jib elements articulated together, the configuration change operations implementing kinematics of folding and unfolding the jib and causing the self-erecting crane to switch from a transport configuration in which the mast and the jib are joined together or side-by-side, into a work configuration in which the mast and the jib are deployed, or vice versa, the control method comprising:

measuring actual inclinations of one or several jib element(s) with respect to a reference axis, by means of one or several inclinometer(s) mounted on the jib element or on the several jib elements; and controlling the configuration change operations according to the actual inclinations of the jib element or of the several jib elements during the kinematics of folding and unfolding the jib.

14. The control method according to claim 13, wherein theoretical inclinations of the jib element or of the several jib elements with respect to the reference axis are stored in a memory, and the control of the configuration change operations comprises a comparison of the theoretical inclinations with the actual inclinations during the kinematics of folding and unfolding the jib.

15. The control method according to claim 14, wherein a folding/unfolding non-compliance is detected if an actual inclination of the jib element or of one of the several jib elements, called non-compliant jib element, does not correspond to the theoretical inclination of the non-compliant jib element during the kinematics of folding and unfolding the jib, wherein the jib occupies successive intermediate configurations between the transport configuration and the work configuration, and vice versa, during the kinematics of folding and unfolding the jib, and wherein the folding/unfolding non-compliance is detected if the actual inclination of the non-compliant jib element does not correspond to the theoretical inclination of the non-compliant jib element in at least one of the intermediate configurations.

16. The control method according to claim 13, wherein a folding/unfolding non-compliance is detected if an actual inclination of the jib element or of one of the several jib elements, called non-compliant jib element, does not correspond to the theoretical inclination of the non-compliant jib element during the kinematics of folding and unfolding the jib.

17. The control method according to claim 16, wherein the configuration change operation is stopped in response to a detection of a folding/unfolding non-compliance.

* * * * *